No. 683,300. Patented Sept. 24, 1901.
H. LANE.
APPARATUS FOR THE MANUFACTURE OF GAS.
(Application filed May 7, 1901.)
(No Model.) 5 Sheets—Sheet 1.

WITNESSES:

INVENTOR
Howard Lane
BY
ATTORNEYS

No. 683,300. Patented Sept. 24, 1901.
H. LANE.
APPARATUS FOR THE MANUFACTURE OF GAS.
(Application filed May 7, 1901.)

(No Model.) 5 Sheets—Sheet 3.

WITNESSES:
INVENTOR
Howard Lane
BY
ATTORNEYS

No. 683,300. Patented Sept. 24, 1901.
H. LANE.
APPARATUS FOR THE MANUFACTURE OF GAS.
(Application filed May 7, 1901.)
(No Model.) 5 Sheets—Sheet 5.

UNITED STATES PATENT OFFICE.

HOWARD LANE, OF BIRMINGHAM, ENGLAND.

APPARATUS FOR THE MANUFACTURE OF GAS.

SPECIFICATION forming part of Letters Patent No. 683,300, dated September 24, 1901.

Application filed May 7, 1901. Serial No. 59,142. (No model.)

*To all whom it may concern:*

Be it known that I, HOWARD LANE, mechanical engineer, a subject of the King of Great Britain, residing at 6 Corporation street, Birmingham, in the county of Warwick, England, have invented certain new and useful Improvements in Apparatus for the Manufacture of Gas for Lighting, Heating, and other Purposes, of which the following is a specification.

My invention comprises an improved apparatus for use in connection with the manufacture of gas. The said gas is made from coal, coke, wood, or other carbonaceous or combustible substances, in conjunction with water, in an apparatus constructed and working as hereinafter described, and by the said manufacture, apparatus, and particular working volatile hyrocarbons, such as ordinary coal, as well as carbon, such as coke or anthracite coal, can be converted into a gas for industrial uses without splitting up, "cracking," or otherwise prejudicially affecting the volatile product.

The apparatus according to my invention is characterized by a generator or producer, a regenerator, a system of valves, and an annular air space and passages, operating and controlling mechanism for said valves, and devices and propelling means for blowing air into the generator or producer and for supplying water or steam to the regenerator.

In the accompanying five sheets of drawings I illustrate apparatus for the purposes of my invention, in which—

Figure 1:
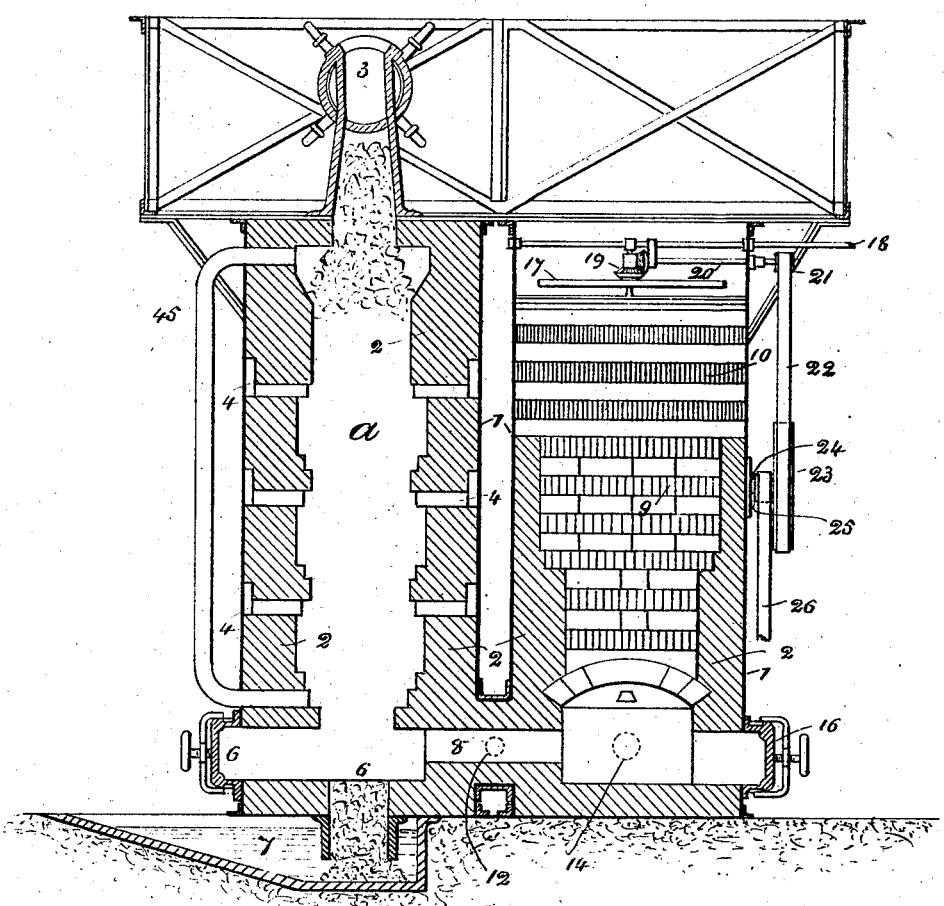
Figure 2:
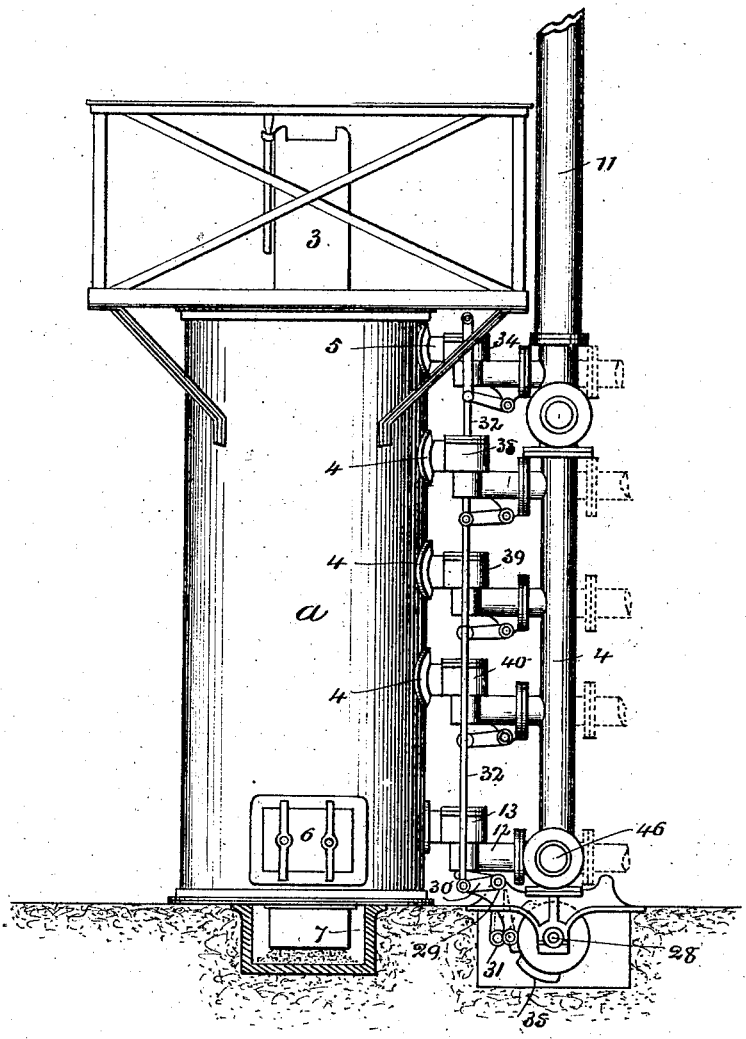
Figure 3:
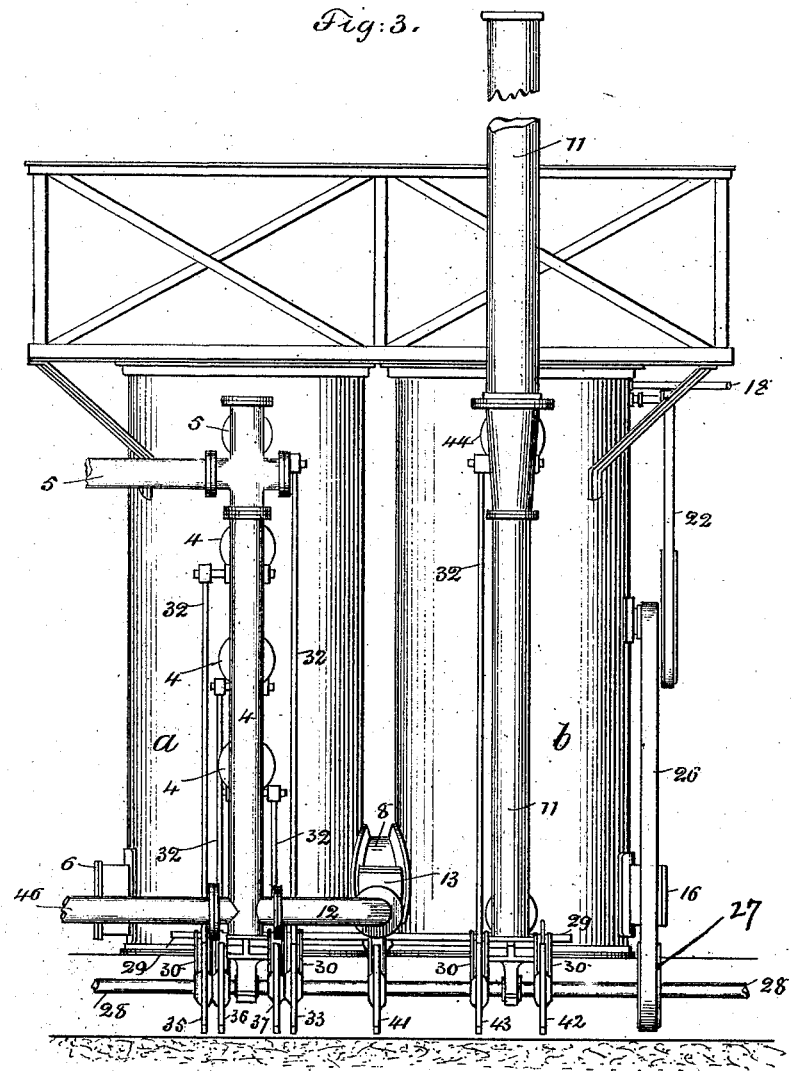
Figure 4:
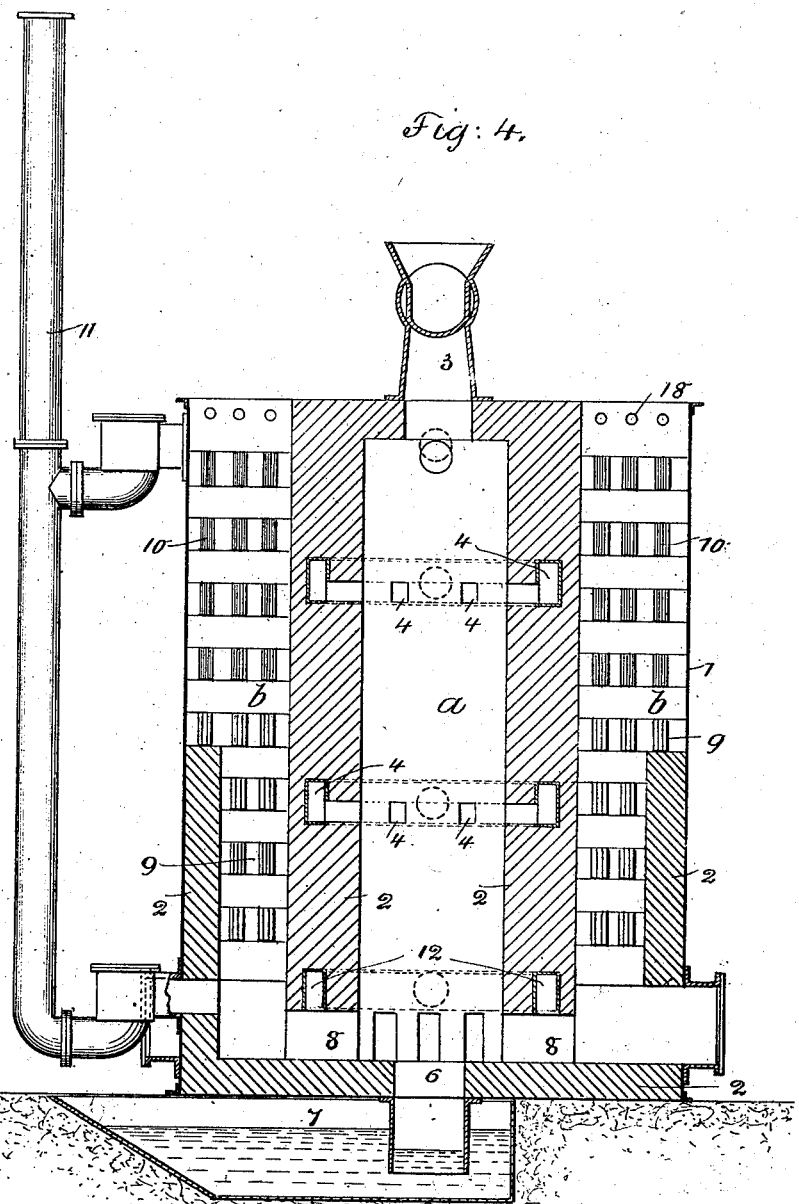

Figure 1 is a vertical section, Fig. 2 a side elevation, and Fig. 3 a front elevation, of apparatus in which the generator and regenerator are shown as separate vessels. Fig. 4 is a vertical section, and Fig. 5 a front elevation, of apparatus in which the generator and regenerator are combined in one vessel or casing.

Similar letters and numerals refer to similar parts throughout the several views.

In Figs. 1, 2, and 3 the generator or producer *a* consists of a vertical metal casing 1, thickly lined with fire-brick or other suitable refractory material 2 and provided at the top with a hopper 3 for the supply of the fuel to be converted into gas. The generator *a* has in its walls a number—in the example three— of air-inlet pipes and passages 4, disposed at different points one above the other, the said inlets consisting of annular spaces, with openings controlled by valves and covers and communicating by radial passages with the interior of the generator at different heights and at different times progressively. There is also near the top of the generator an outlet passage and pipe 5, controlled by a valve for the delivery of the gas. The generator is also fitted with sight and poking holes and other fittings common to similar furnaces and not therefore necessary to more particularly describe or illustrate, and at its base a fireplace 6 is provided for the initial starting of the apparatus. At the bottom of the generator there is an outlet through which the ashes fall into an ash pan or trough 7, which is kept nearly full of water in order to seal the outlet and keep the generator gas-tight. The ashes as they fall can be raked out periodically and removed from the ash-pan.

The generator is connected at its base by a passage 8 with the base of a regenerator *b*, consisting of a vertical metal casing 1, thickly lined with refractory material 2 and partly filled with fire-brick checker-work 9 and partly with checker-work of iron 10 or other material not liable to disintegrate under the action of moisture and heat. At its upper end the regenerator *b* is connected with a chimney 11, which is opened and closed by a valve, and at some suitable point in the regenerator, preferably near the base, is an air-inlet pipe and passage 12, fitted with a valve in a casing 13, and a scavenging-outlet 14, fitted with a valve in a casing 15. The regenerator has also sight-holes (not shown) for enabling its interior to be inspected and a suitable door 16 for cleaning purposes.

In the regenerator above the iron checker-work 10 is mounted a revolving distributer 17, supplied with water, as required, through a pipe 18, controlled by a tap or valve. (Not shown.) The distributer 17 is revolved by a pair of bevel-gears 19, shaft 20, belt-pulley 21, belt 22, and pulley 23 on a shaft 24, which is driven by a pulley 25, belt 26, and pulley 27 from a shaft 28, which is driven in any convenient manner from a gas-engine or other suitable motor and has mounted on it the cams for actuating the several gas and air valves by the following or any other convenient arrangement of mechanism. There is a rod or shaft 29 fixed parallel to the shaft 28, and on this rod 29 are pivoted loosely as many elbow-levers 30 as there are cams on the shaft 28, and each elbow-lever has an antifriction-roller 31 at its end contiguous to its cam, while at the other end it is connected by a rod 32 to the valve which it controls. Thus the cam 33, through its elbow-lever 30 and connecting-rod 32, opens and closes the valve in the casing 34, which controls the gas-outlet pipe 5 from the top of the generator $a$. The cams 35 36 37, through their respective elbow-levers 30 and connecting-rods 32, open and close the valves in the casings 38 39 40, which control the air-blast supplied to the several inlets 4 of the generator. In like manner the cam 41 opens and closes the valve in the casing 13, controlling the air-inlet 12 to the passage 8 between the generator and regenerator, the cam 42 opens and closes the valve in the casing 15, controlling the scavenging-outlet 14 from the regenerator, and the cam 43 opens and closes the valve in the casing 44, controlling the outlet at the top of the regenerator to the chimney 11.

When starting the apparatus, a little fuel is fed through the hopper 3 into the interior of the generator and a fire is started in the fireplace 6 beneath it, the cleaning and poking orifices being open at the time. As the fuel burns the cleaning and poking orifices are closed and a fresh supply of fuel is gradually fed in through the hopper 3 until the whole mass within the interior becomes highly heated. The fresh fuel, owing to the high temperature of the generator, at once volatilizes to the extent of giving off a combustible gas, which may be allowed to pass off through the gas-outlet pipe 5 to a holder, (not shown,) whence it may be conducted to the gas-engine (where such is employed) and utilized to run the engine for a few turns while starting the apparatus. Then the gas-valve 34 is closed and the outlet-valve 44 from the regenerator to the chimney is opened and the ordinary working of the apparatus now begins. First, air is blown into the generator from a suitable fan or equivalent. (Not shown, but connected to a pipe 46, leading to the pipes and passages 4 and 12.) The air passes down through the highly-heated mass of fuel first from the highest air-inlet 4 and then from the next in order lower down, the valves 38 39 40 of said inlets being opened and closed by their respective cams to bring the said inlets progressively into action, and thereby create a series of zones of high temperature at different heights, which combine to constitute a column of incandescent fuel. During the blowing period, as described, the gaseous products of combustion pass from the generator $a$ into the lower extremity of the regenerator $b$ and in their passage meet a supplementary supply of air admitted by the valve 13 through the air-inlet 12, whereby complete combustion is effected. After this the gaseous products ascend up the interior of the regenerator first through the fire-brick checker-work 9 and then through the iron checker-work 10, which absorb the heat from the products before they escape up the chimney. When the regenerator has become highly heated, the blowing period is terminated and all the air-valves 38, 39, 40, and 13 are closed, as well as the valve 44, controlling the outlet to the chimney 11. The scavenging-valve 15 is then opened and the tap or valve of the water-supply is also opened automatically—say by a cam—so that water is sprayed upon the heated iron checker-work 10 and is instantly converted into steam, which passes downward through the interior of the regenerator and displacing the remnant of combustion products therein scours them out through the scavenging-opening 14. The scavenging-valve 15 is only opened for a very brief period, and immediately it is closed the gas-outlet valve 34 of the generator is opened. The steam, now superheated by passing over the refractory material in $b$, passes along the passage 8 up through the column of incandescent fuel in the generator, and in so doing becomes decomposed into its constituents, hydrogen, carbonic oxid, and other gases being produced. These gases now pass up through the green or raw fuel at the top of the generator and subject it to destructive distillation, the hydrocarbon and other vapor thereby liberated mixing with the said gases and passing away with them through the gas-outlet pipe 5 to the gas-holder. To facilitate combustion and prevent caking or clinkering of such fuel in the generator $a$ as has that tendency, a smoke pipe or passage 45 may be employed leading from the upper part to the lower part of the generator. The effect of this pipe or passage is by providing an outlet in the upper part of the generator to cause an updraft of part of the blast introduced through the air-inlet passages. Any suitable and known means for scrubbing and purifying the gas may be employed, if required for illuminating or certain other purposes; but for heating or the like the gas may be used as produced. On the termination of the gas-making period the blowing period in the generator recommences. Thus it will be seen that water-gas is first formed and then is converted into a richer gas by its passage through and its action upon the green or raw fuel.

As already stated, the apparatus may be operated by any convenient motor, and if a gas-engine be employed the gas-producing plant is intended to make the gas necessary for the engine, and this engine will, through the shafts, cams, and connecting mechanism, effect the automatic working of the apparatus.

Figure 5:
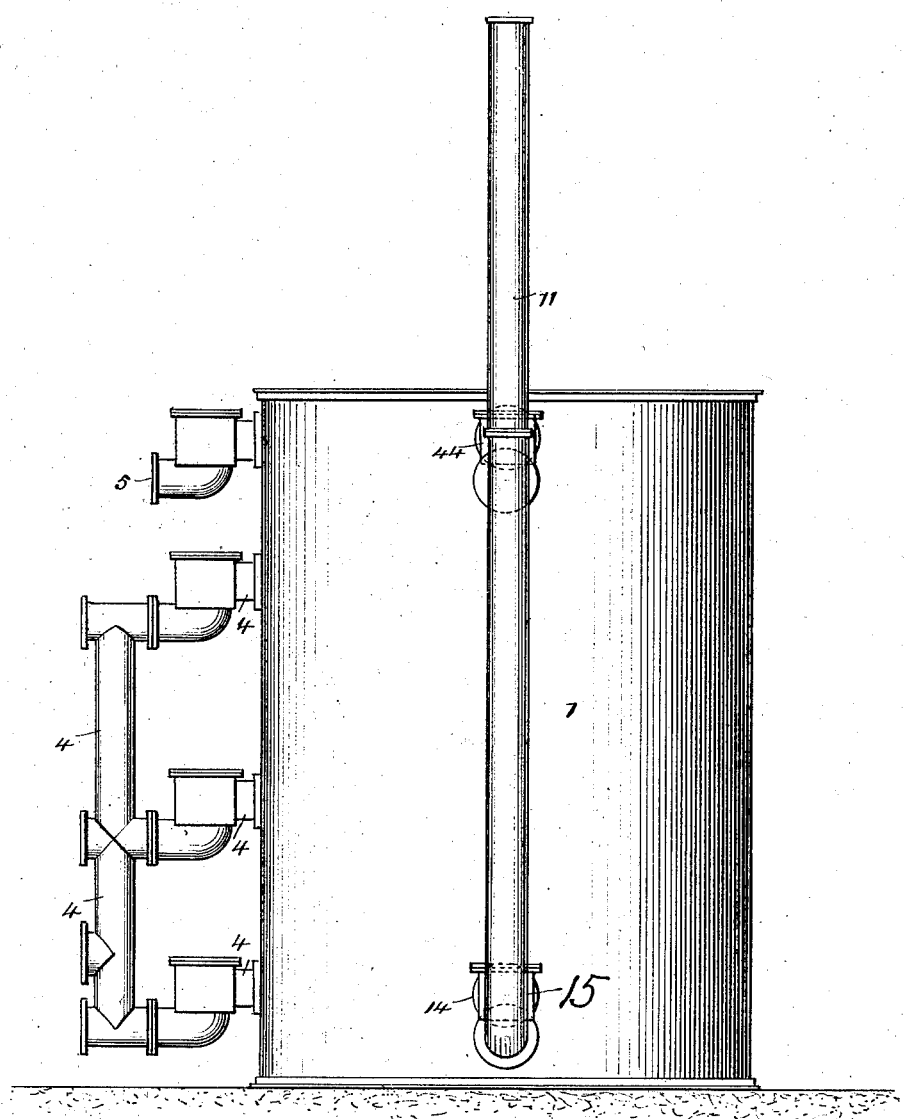

It will be readily understood that the herein-described process of gas production could be carried out in other forms of apparatus suitably arranged for carrying out the cycle of operations specified, and as an example one such alternative arrangement of apparatus is illustrated in Figs. 4 and 5. In these views the generator a and the regenerator b are shown combined within one metal casing 1, the regenerator taking the form of an annular chamber or jacket surrounding the generator. In this arrangement only two air blasts or inlets 4 are shown to the generator; but the method of working and the order of the cycle of operations are identically the same as that already described.

What I claim, and desire to secure by Letters Patent of the United States, is—

1. In combination in a gas-making apparatus, a generator, a regenerator, a connection between the lower ends of the generator and regenerator, means for introducing air beneath the raw fuel in the generator and for forcing the gaseous products of combustion downward in said generator and through said low connection to the regenerator means whereby air may be introduced in said low connection to complete combustion, the checker-work in the regenerator composed in its lower part of fire-brick and in its upper part of metal, a water-spray for directing water to the checker-work, means for scouring out the remnant of the gaseous products of combustion from said regenerator, means for directing the steam from the regenerator up through the fuel in the generator.

2. An apparatus for the manufacture of gas made from fuel and water and comprising a generator and a regenerator furnished with a fire-grate and water seal near the bottom and an aperture for feeding in the coal and a gas-outlet at the top as well as a series of air-inlet pipes and passages at intermediate points and a passage communicating with the regenerator, an air-inlet pipe and passage for a supplementary air-supply introduced into the passage between the generator and regenerator, an arrangement of checker-work within the regenerator, means for supplying and spraying water on the upper part of said checker-work, an outlet from the top of the regenerator to a chimney and a scavenging-outlet from the bottom, and means for controlling the said air and water inlets and outlets, substantially as described.

3. In combination, a generator, a regenerator, a connection between the lower ends of the same, a plurality of air-inlets in the generator arranged at different levels, an air-inlet to supply air to the products of combustion from the generator to complete said combustion, a spray-pipe at the upper end of the regenerator, a scavenging or scouring outlet at the lower end of the regenerator and means for controlling said inlets and outlets, substantially as described.

In witness whereof I have hereunto set my hand in presence of two witnesses.

HOWARD LANE.

Witnesses:
 H. B. BARLOW,
 HERBERT R. ABBEY.